United States Patent
Shoaf et al.

(10) Patent No.: US 11,032,972 B2
(45) Date of Patent: Jun. 15, 2021

(54) TRIPLEX GREENSMOWER OPEN FOOT PLATFORM COVER

(71) Applicant: Deere & Company, Moline, IL (US)

(72) Inventors: Gilbert Shoaf, Apex, NC (US); Taylor Waitt, Benson, NC (US); Justin Rothrock, Willow Spring, NC (US)

(73) Assignee: Deere & Company, Moline, IL (US)

( * ) Notice: Subject to any disclaimer, the term of this patent is extended or adjusted under 35 U.S.C. 154(b) by 167 days.

(21) Appl. No.: 16/175,349

(22) Filed: Oct. 30, 2018

(65) Prior Publication Data

US 2020/0128748 A1  Apr. 30, 2020

(51) Int. Cl.
*A01D 67/00* (2006.01)
*A01D 34/44* (2006.01)
*A01D 34/62* (2006.01)

(52) U.S. Cl.
CPC ............ *A01D 67/00* (2013.01); *A01D 34/44* (2013.01); *A01D 34/62* (2013.01)

(58) Field of Classification Search
CPC ...... A01D 61/002; A01D 61/02; A01D 57/20; A01D 34/44; A01D 2101/00; A01D 75/30; B65G 15/42; B65G 15/46; B65G 15/30
See application file for complete search history.

(56) References Cited

U.S. PATENT DOCUMENTS

| | | | |
|---|---|---|---|
| 3,716,975 A * | 2/1973 | Smith | A01G 3/062 56/17.4 |
| 4,750,319 A | 6/1988 | Aldred | |
| 4,930,298 A | 6/1990 | Zenner | |
| 5,331,794 A * | 7/1994 | Reichle | A01D 75/20 56/17.4 |
| 5,553,445 A | 9/1996 | Lamb et al. | |
| 5,842,707 A | 12/1998 | Smith | |
| 6,226,876 B1 * | 5/2001 | Ezell | A01D 34/4167 30/276 |
| 6,351,929 B1 | 3/2002 | Gust et al. | |
| 7,475,530 B2 | 1/2009 | Hensley | |
| 9,370,139 B2 | 6/2016 | Legault et al. | |
| 10,358,017 B1 * | 7/2019 | Harris | B60J 1/025 |

(Continued)

FOREIGN PATENT DOCUMENTS

| | | |
|---|---|---|
| EP | 2050329 A1 | 4/2009 |
| EP | 2082916 A1 | 7/2009 |

(Continued)

OTHER PUBLICATIONS

European Search Report issued in counterpart European Patent Application No. 19204962.5 dated Mar. 20, 2020 (6 pages).

*Primary Examiner* — Arpad Fabian-Kovacs

(57) ABSTRACT

A triplex greensmower open foot platform provides an opening in front of an operator seat providing visibility from the operator seat to a center reel cutting unit. The opening has sufficient dimensions for removal or installation of the center reel cutting unit or a grass catcher therethrough. A pair of platform sections provides a perimeter at least partially around the opening. Each of the platform sections including a footrest and a rearwardly extending coupling that is manually removable from the triplex greensmower. A flexible cover may be removably attached to the platform and extend over the opening and at least part of the center reel cutting unit.

12 Claims, 8 Drawing Sheets

(56) References Cited

U.S. PATENT DOCUMENTS

| | | | |
|---|---|---|---|
| 2009/0272090 A1* | 11/2009 | Blakeslee | ............ A01D 41/14 56/192 |
| 2013/0298516 A1* | 11/2013 | Houston | ................ A01D 41/12 56/207 |
| 2018/0042173 A1 | 2/2018 | Henson | |

FOREIGN PATENT DOCUMENTS

| | | |
|---|---|---|
| EP | 3440915 A2 | 2/2019 |
| GB | 191416105 A | 6/1915 |

* cited by examiner

TRIPLEX GREENSMOWER OPEN FOOT PLATFORM COVER

FIELD OF THE INVENTION

The present invention relates to grass mowing machines, and more specifically to triplex greensmowers.

BACKGROUND OF THE INVENTION

Grass mowing machines used to mow golf courses, parks, and athletic fields where a high quality of cut is desired, may include three or more reel cutting units. Triplex greensmowers have two forward reel cutting units followed by a center or rear reel cutting unit positioned under the vehicle frame and in front of the operator station. Each reel cutting unit on a triplex greensmower may be mounted to a lift arm that may be used to raise and lower the cutting unit between a mowing position and a transport position. Reel cutting units have front and rear rollers, spiral cutting blades rotating in close proximity to a bedknife, and may have a removable grass catcher mounted in front of the cutting unit.

There is a need for a triplex greensmower that provides better quality of cut and reduces the tendency of reel cutting units to leave marks or step cuts on the turf. There is a need for a triplex greensmower that reduces the impact of each reel cutting unit when it is lowered to the mowing position with the front and rear rollers parallel to the ground to distribute the load evenly. There is a need for a triplex greensmower that eliminates the pendulum effect in which reel cutting units tend to swing from the lift arms. There also is a need for a triplex greensmower that provides improved access to the center or rear reel cutting unit for service, and for emptying and replacing the grass catcher. There also is a need for a triplex greensmower that provides improved access to the center or rear reel cutting unit while blocking or preventing debris discharged by the cutting unit from reaching the operator when a grass catcher is not used.

SUMMARY OF THE INVENTION

A triplex greensmower open foot platform includes a left platform section and a right platform section, each section removably attached to a triplex greensmower with a coupling extending rearwardly from the section and that is slidable into a frame member of the triplex greensmower. The left platform section and the right platform section define the perimeter of an opening in front of an operator seat on the triplex greensmower that has a larger length and width than a center reel cutting unit or a grass catcher attached thereto. The left platform section and the right platform section each include a foot rest and a narrower neck portion extending from the foot rest. The triplex greensmower open foot platform provides improved access to the center or rear reel cutting unit for service, and for emptying and replacing the grass catcher. The triplex greensmower open foot platform cover provides improved access to the center or rear reel cutting unit while blocking or preventing debris discharged by the cutting unit from reaching the operator when a grass catcher is not used.

DESCRIPTION OF PREFERRED EMBODIMENT

Figure 1:
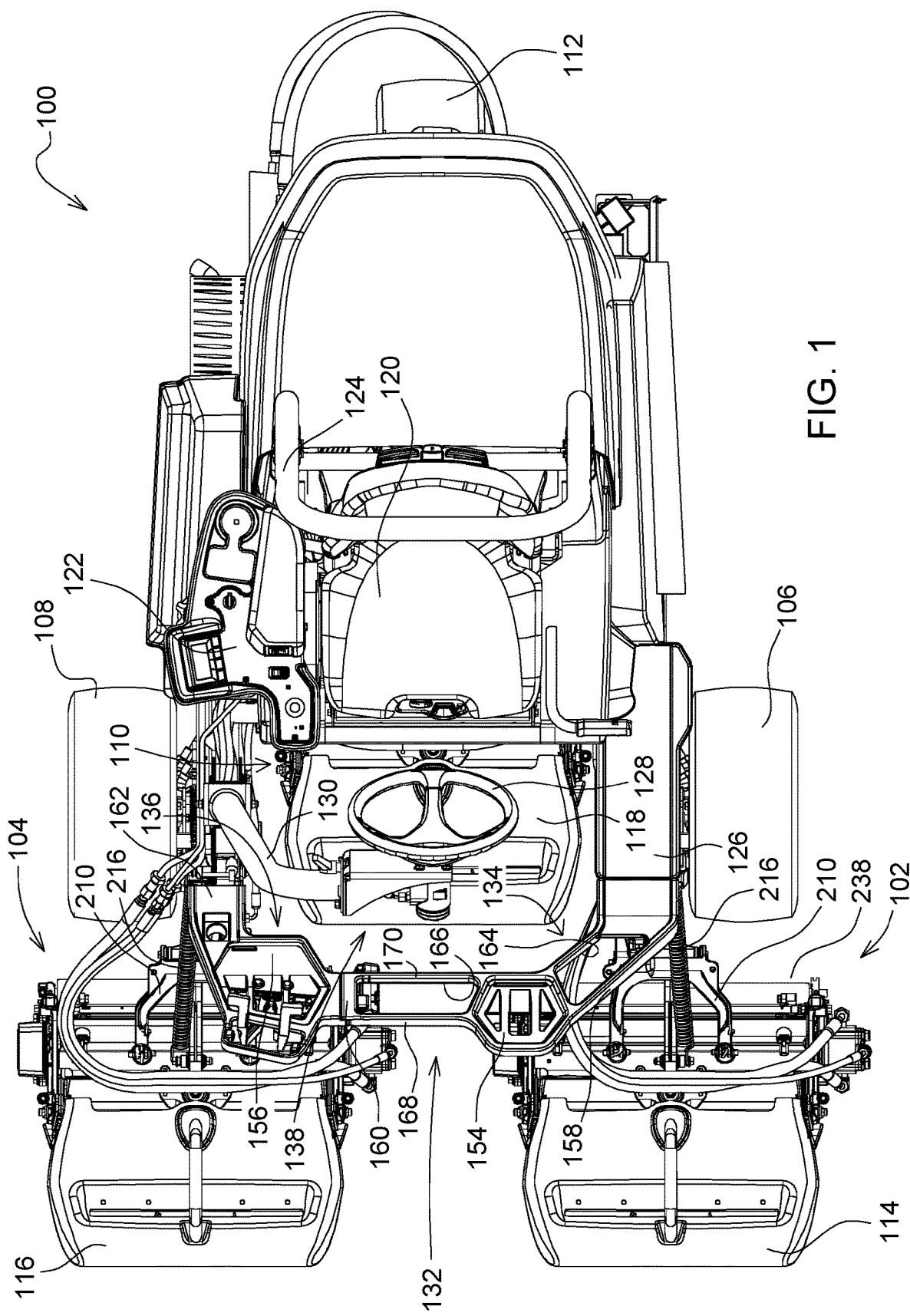
FIG. 1 is a top view of a triplex greensmower according to a first embodiment.

In a first embodiment shown in FIG. 1, triplex greensmower 100 includes left and right front reel cutting units 102, 104 positioned side-by-side forwardly of left and right drive wheels 106, 108, and center or rear reel cutting unit 110 positioned behind the drive wheels and in front of steerable rear wheel 112. Grass catchers 114, 116 and 118 may be removably attached to the front of each of the reel cutting units. An electric or hydraulic motor may drive each cutting reel and may be mounted to one side of the reel cutting unit. The triplex greensmower may have operator seat 120 between the drive wheels and rear wheel, console 122 adjacent the operator seat, and roll over protection system or ROPS 124 attached to the frame behind and alongside the operator seat. Step 126 may be mounted to the frame of the triplex greensmower to the left side and below the operator seat, and steering wheel 128 may be mounted on steering column 130 to the right and in front of the operator seat.

Figure 2:
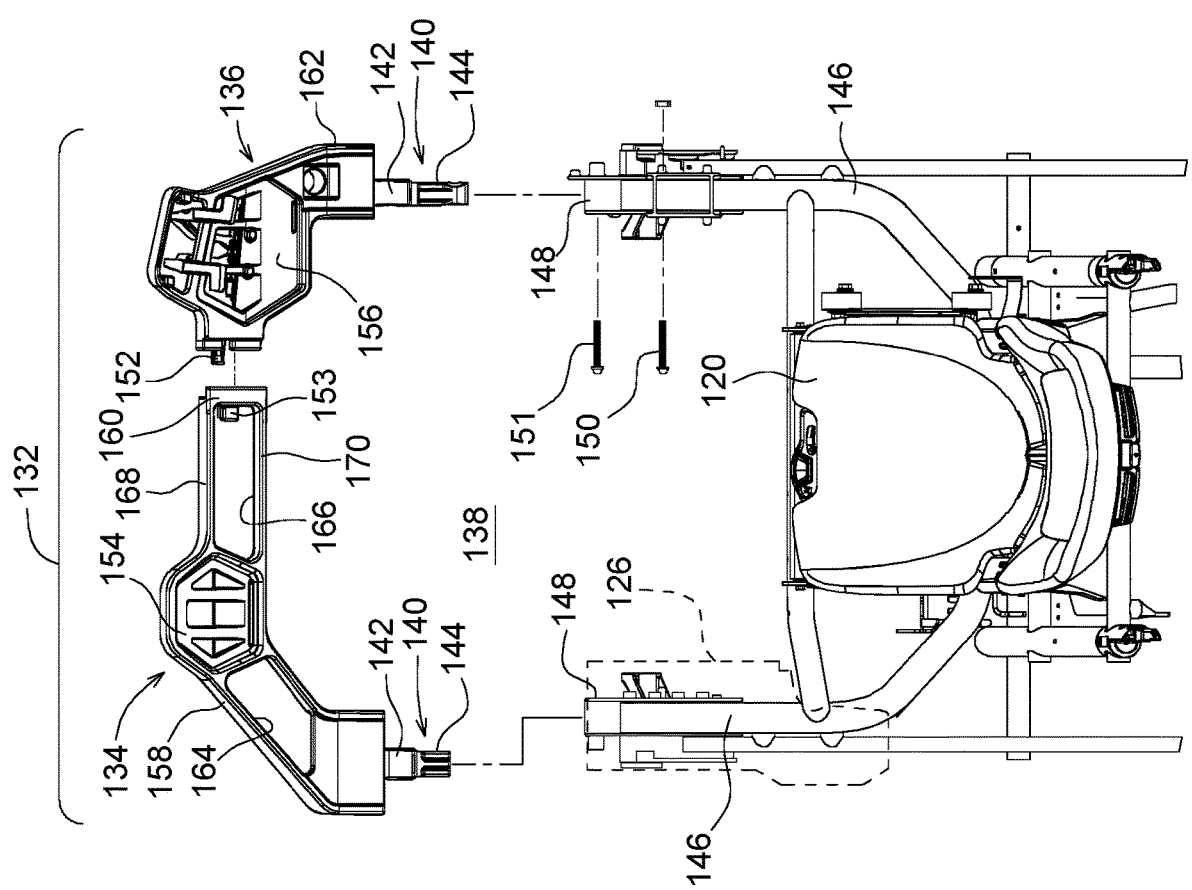
FIG. 2 is an exploded top view of a triplex greensmower open foot platform according to a first embodiment.

In one embodiment, as shown in FIG. 2, triplex greensmower 100 may include open foot platform 132 having a left platform section 134 and right platform section 136. The left and right platform sections may be metal castings, molded plastic, composite or other materials that define the perimeter of an opening 138 in front of operator seat 120. From the operator seat, an operator may have an unobstructed sight line through opening 138 in triplex greensmower open foot platform 132 for visibility of grass catcher 118 and center cutting unit 110. An operator also may lift the grass catcher through the opening in the triplex greensmower open foot platform for emptying and replacement. Additionally, an operator may use the opening in the triplex greensmower open foot platform to service the center cutting unit, and may remove or replace the center cutting unit through the opening. The opening in the triplex greensmower open foot platform may have width and length dimensions larger than the width and length of the center reel cutting unit or grass catcher. For example, the opening may have side-to-side and front-to-back dimensions of 32 inches and 22 inches respectively, which may be larger than dimensions of the reel cutting unit or grass catcher.

In an alternative embodiment, the triplex greensmower open foot platform may have a single platform section instead of left and right platform sections. The single platform section may extend partially or completely around the opening for the center cutting unit.

In one embodiment, as shown in FIG. 2, triplex greensmower open foot platform 132 may include left and right plafform sections 134, 136, at least one of the platform sections being removable from the triplex greensmower without requiring tools. For example, at least one of the platform sections may include a coupling 140 that extends rearwardly from the platform section and may be used by the operator to manually engage and disengage the platform section from the triplex greensmower frame. Each coupling 140 may include a base portion 142 and a post 144 extending from the base. Each post 144 may slide into one end of main frame support tube 146, and each base portion 142 may slide into channel 148 extending over the end of the main frame support tube. The base portion and channel each may have rectangular cross sections to prevent twisting or pivoting of each coupling relative to the frame.

In one embodiment, triplex greensmower open foot plafform 132 may be locked or secured to the triplex greensmower frame. For example, one or more locking members 150, 151 such as a bolt, pin or fastener, may be inserted through holes aligned in coupling 140, and in main frame support tube 146 and/or channel 148.

In one embodiment, the triplex greensmower open foot platform may include a latch 152 to lock or secure together the left and right platform sections 134, 136 when both sections are engaged to the triplex greensmower frame. For example, latch 152 may be provided on the forward end of right platform section 136 and may capture an abutment 153 on the forward end of left platform section 134. Alternatively, a slot and tab or other mechanism may be used for securing or locking together the left and right platform sections. Securing or locking together the left and right platform sections also helps prevent disengagement of each coupling 140 from main frame support tube 146 and channel 148.

In one embodiment, the triplex greensmower open foot platform may include left and right footrests 154, 156, and neck portions 158, 160, 162 extending from or between the left and right footrests. The neck portions may be narrower than the footrests. Additionally, one or more openings 164, 166 may be provided through the neck portions to provide the operator with unobstructed sight lines and visibility to the front reel cutting units. For example, the neck portions may include parallel bars 168, 170 that are spaced apart.

Figure 3:
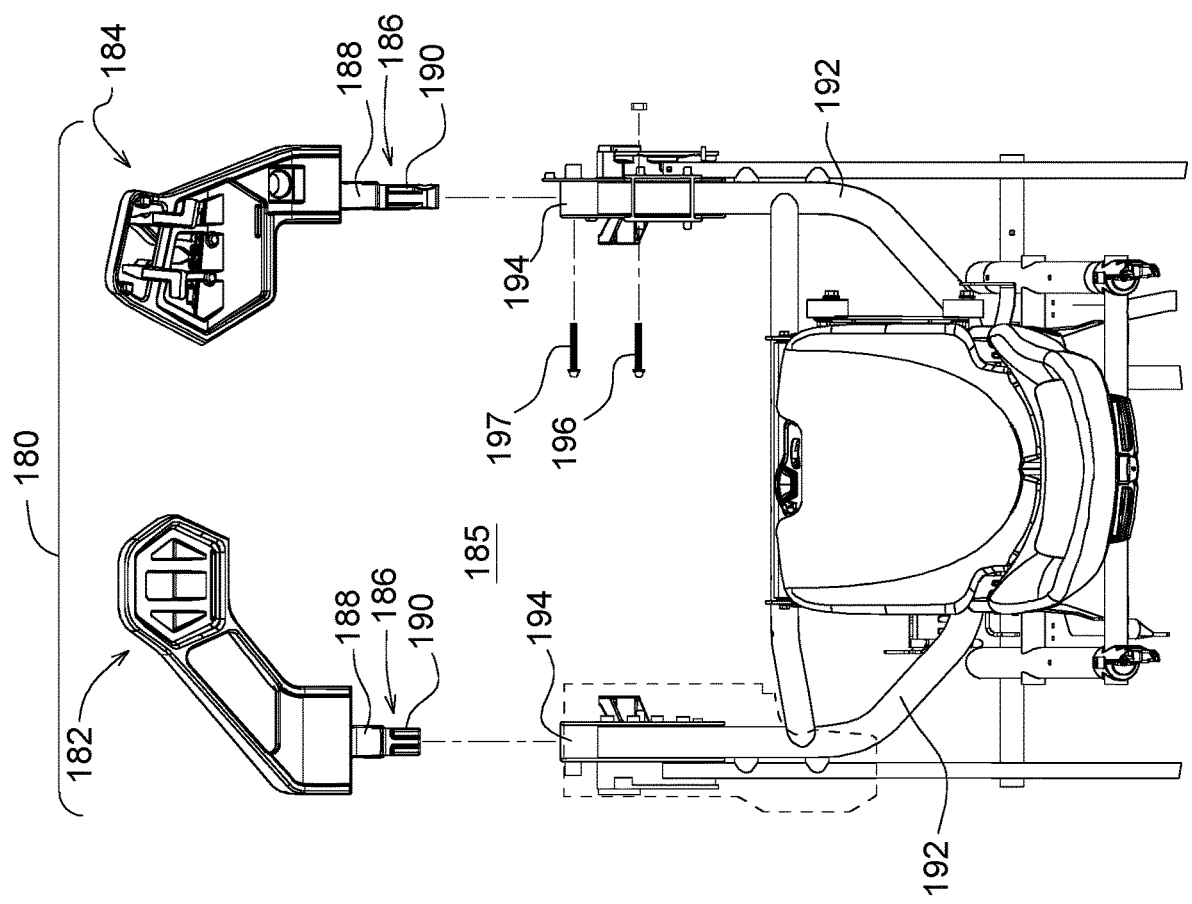
FIG. 3 is an exploded top view of a triplex greensmower open foot platform according to a second embodiment.

In a second embodiment shown in FIG. 3, triplex greensmower open foot platform 180 may include left and right platform sections 182, 184, and opening 185. In the second embodiment, the left and right platform sections may not be secured or locked together. The second embodiment also may not include a neck portion or latch extending between the left and right platform sections. Each of the left and right platform sections may include a coupling 186 that includes a base portion 188 and a post 190. Each post 190 may slide into one end of main frame support tube 192, and each base portion 188 may slide into channel 194 extending over the end of the main frame support tube. The base and channel may have rectangular cross sections to prevent twisting or pivoting of the coupling relative to the frame. One or more locking members 196, such as a bolt, pin or fastener may lock either coupling to the frame.

Figure 4:
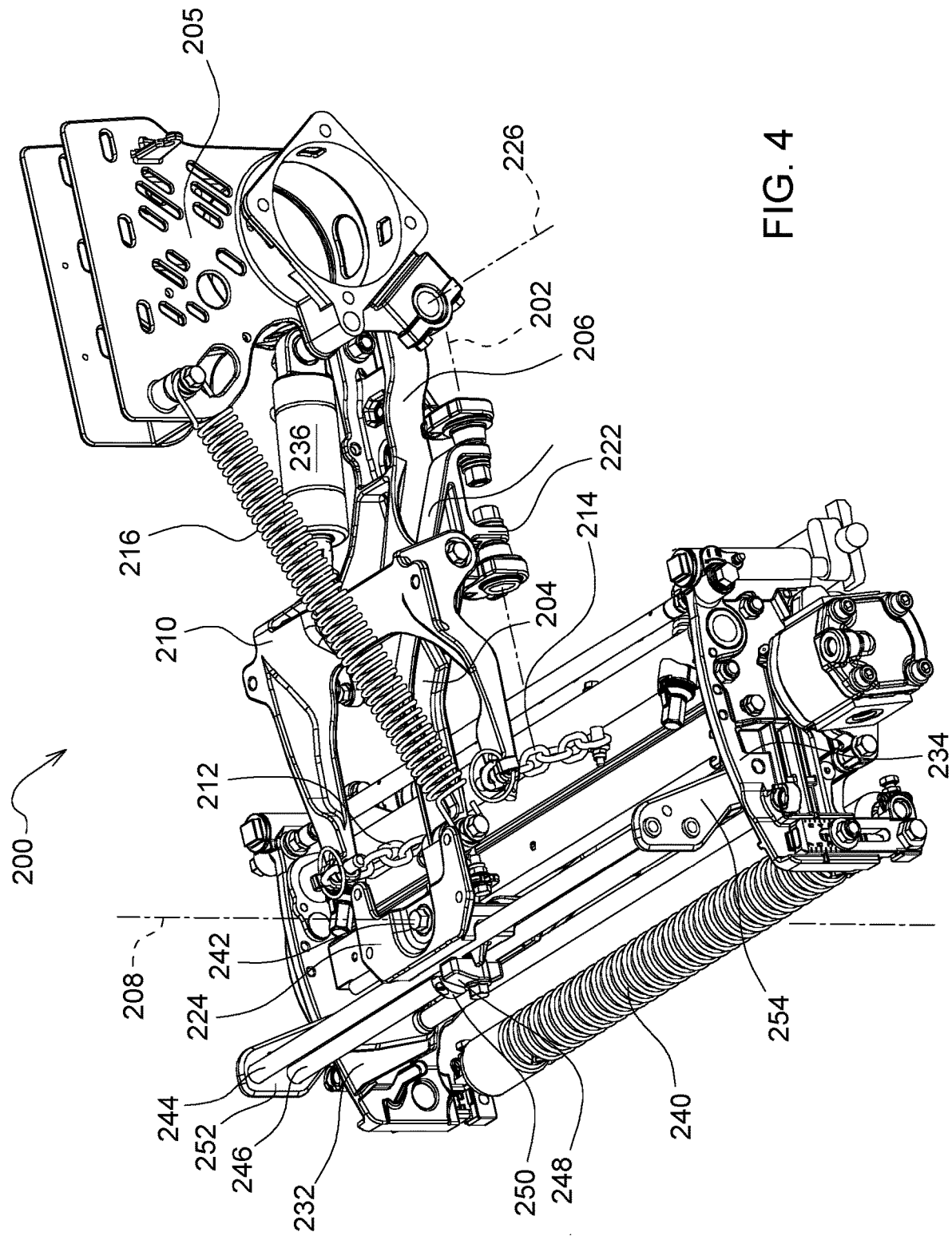
FIG. 4 is a perspective view of a triplex greensmower lift system on a left front reel cutting unit according to a first embodiment.
Figure 5:
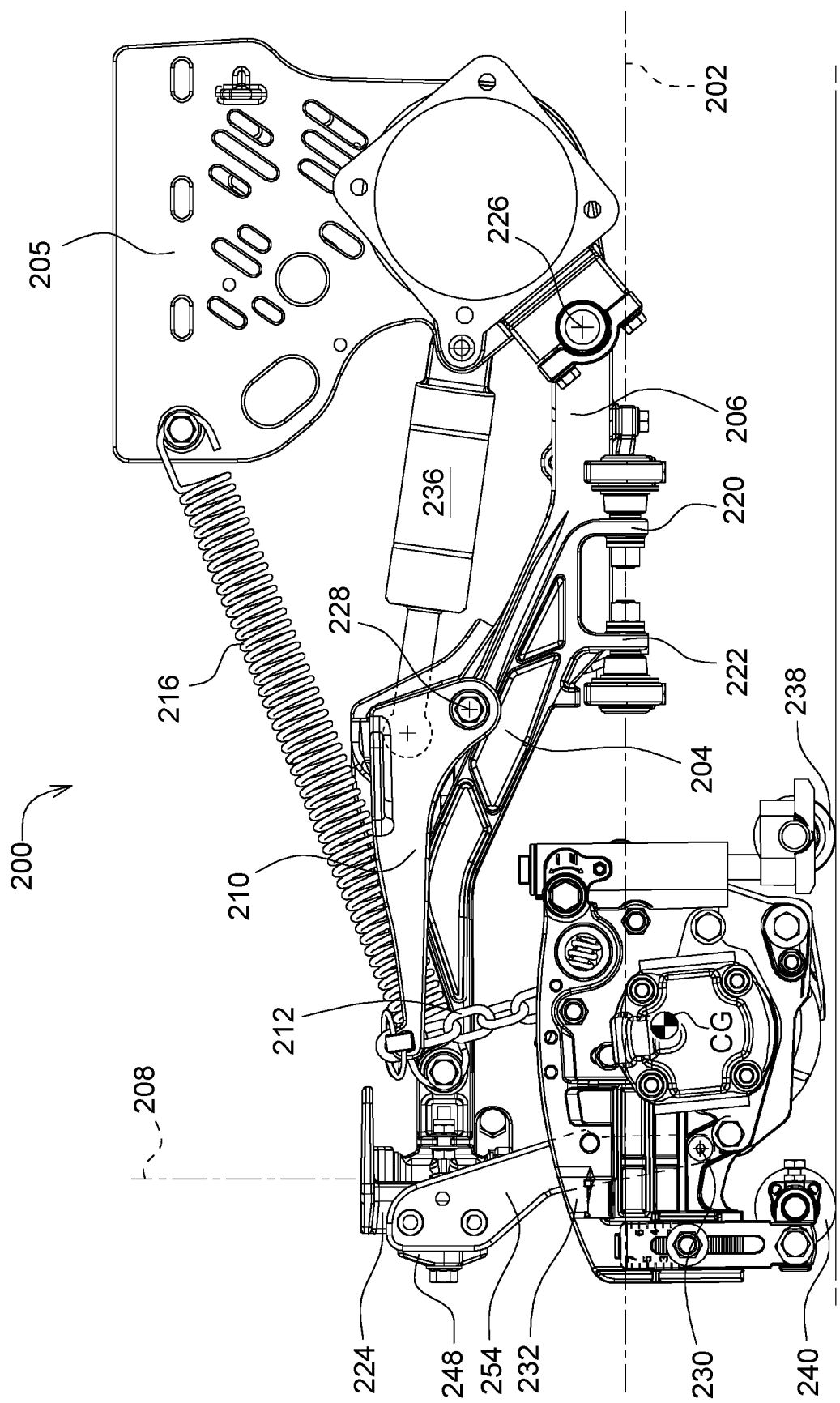
FIG. 5 is a side view of a triplex greensmower lift system on a left front reel cutting unit in the mowing position according to a first embodiment.
Figure 6:
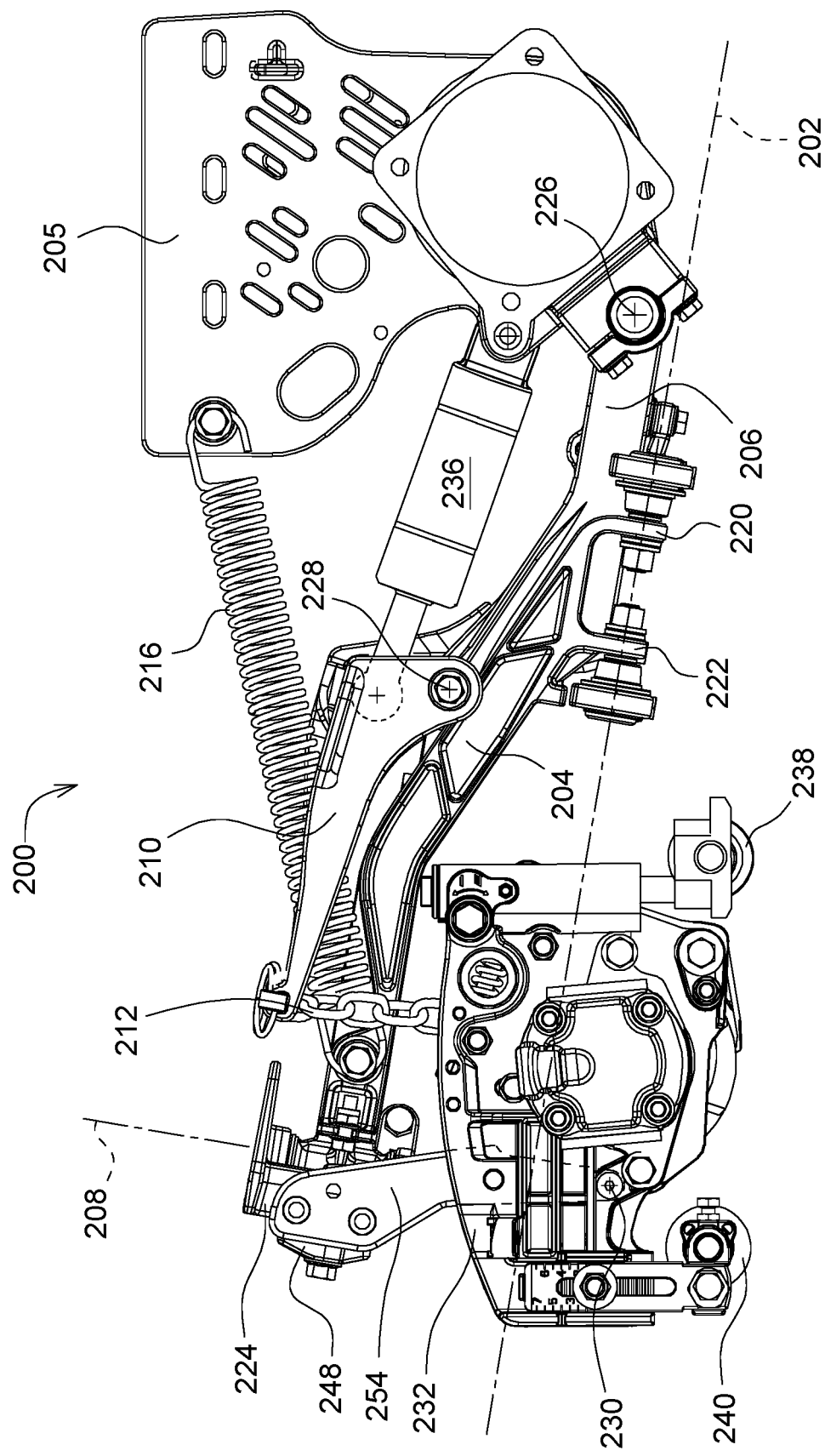
FIG. 6 is a side view of a triplex greensmower lift system on a left front reel cutting unit in the transport position according to a first embodiment.

In one embodiment, as shown in FIGS. 4-6, triplex greensmower 100 may include lift system 200 for each reel cutting unit. Each lift system 200 may allow each reel cutting unit to follow ground contours when mowing, and may be used to raise and lower a reel cutting unit between the mowing and transport position. Each lift system 200 may include roll axis 202 where upper lift arm 204 may be pivotably mounted to lower lift arm 206. Roll axis 202 may be behind the reel cutting unit, at a height or elevation between the top of the cutting unit and the center of gravity (CG) of the cutting unit, and preferably within about 50 mm of the CG. Each lift system 200 may include yaw axis 208 which may be where yoke mount 224 is connected to the forward end of upper lift arm 204, in front of the CG of the cutting unit. Each lift system 200 also may include lift axis 226 where lower lift arm 206 may be pivotably mounted to the vehicle frame behind the cutting unit, lifter support axis 228 where lifter support 228 may be pivotably mounted to lower lift arm 206, and cutting unit mounting axis 230 where yoke mount 224 may be pivotably connected to the reel cutting unit side panels 232, 234. Each axis may be positioned at a different location relative to the CG of the cutting unit. The triplex greensmower lift system also may include a pair of flexible linkages 212, 214 between lifter support 210 and the cutting unit to hold the cutting unit still when it is raised from the ground. Additionally, the lift system may include tension spring 216 connected between the forward end of upper lift arm 204 and triplex greensmower frame member 205 behind and above the reel cutting unit.

In one embodiment, triplex greensmower lift system 200 may include upper lift arm 204 that is pivotably mounted with bearings 220, 222 to lower lift arm 206 behind the reel cutting unit. The mounting location of the upper lift arm provides a roll axis 202 that is between the top of the cutting unit and the center of gravity (CG) of the cutting unit, and preferably within about 50 mm from the CG of the cutting unit. From roll axis 202, upper lift arm 204 may extend forwardly and upwardly where it may be attached to yoke mount 224. Positioning the roll axis in close proximity to the cutting unit's CG minimizes gravity-induced positional displacement of the cutting unit when mowing on hillsides, reduces the possibility of unlapping (leaving uncut strips between cutting units), and reduces the pendulum effect, which is the tendency of a cutting unit to swing when raised in the transport position. Tension spring 216, connected between the forward end of upper lift arm 204 and triplex greensmower frame member 205, may provide stability to the roll of the cutting unit and also may reduce the tendency of the cutting unit to leave marks on the turf by transfer of weight of the cutting unit to the vehicle frame.

In one embodiment, triplex greensmower lift system 200 may include yoke mount 224 which provides yaw axis 208 to give the reel cutting unit a full range of steering as the vehicle turns on an axis perpendicular to the ground plane. The location of the yaw axis is forward of the CG of the reel cutting unit and preferably at least about 90 mm forward of the CG of the cutting unit. Yoke mount 224 may be pivotably connected to a sleeve on the forward end of upper lift arm 204. A vertical bolt or rod 242 may be inserted through the yoke mount and sleeve, enabling the yoke mount to pivot on vertical yaw axis 208. The front of yoke mount 224 may include a pair of channels or groove where upper rod 244 and lower rod 246 may be secured and clamped with clamping member 248. The yoke mount does not provide a pitch axis at this location. Instead, the yoke mount may include yoke arms 252, 254 attached to the ends of the upper and lower rods, and extending downwardly where they may be pivotably mounted to side panels 232, 234 of the reel cutting unit at cutting unit mounting axis 230. Cutting unit mounting axis 230 provides a pitch axis for the reel cutting unit that is below and forward of the reel cutting unit's CG. Additionally, clamping member 248 may be loosened and releases to allow shifting the reel cutting unit left or right relative to the yoke mount. A stop may be provided on at least one of the rods to define a desired position.

In one embodiment, triplex greensmower lift system 200 may include lift axis 226 between lower lift arm 206 and the triplex greensmower frame, lifter support axis 228 between lifter support 210 and lower lift arm 206, and cutting unit mounting axis 230 between yoke arms 252, 254 and the cutting unit side panels 232, 234. Each of the lift axis 226, lifter support axis 228 and cutting unit mounting axis 230 may provide a pitch axis that allows the reel cutting unit to follow ground contours by pitching on an axis that is horizontal and perpendicular to the direction of travel, and also may allow the reel cutting unit to stay approximately level when it is raised and lowered between the mowing position and transport position. Tension spring 216 also may bias the reel cutting unit upwardly relative to lift axis 226 and reduce ground pressure of the cutting unit on the turf during mowing. Preferably, the tension spring on the left front reel cutting unit may be connected at a location offset to the left side of the upper lift arm, and the tension spring on the right front reel cutting unit may be connected at a location offset to the right side of the upper lift arm. As a result, each of the tension springs may reduce ground pressure and prevent marks or step cuts by biasing the left side of the left front reel cutting unit upwardly during left turns, and biasing the right side of the right front reel cutting unit upwardly during right turns.

In one embodiment, triplex greensmower lift system 200 may include lifter support 210 and a pair of flexible linkages 212, 214 that hold the reel cutting unit approximately level and prevent swinging of the cutting unit while it is raised to the transport position. To raise the cutting unit to the transport position shown in FIG. 6, lift cylinder 236, which may be a hydraulic cylinder or electric actuator, may be retracted. Lift cylinder 236 may be connected to lifter support 210, and retraction of the lift cylinder pivots the lifter support upwardly on lifter support axis 228. A pair of flexible linkages 212, 214, such as a pair of chains, may connect each leg of the U-shaped lifter support 210 to the reel cutting unit behind the cutting unit's center of gravity (CG). Yoke arms 252, 254 may be pivotably connected to the reel cutting unit in front of its center of gravity. When the lift cylinder retracts, lifter support 210 may pull up the pair of flexible linkages 212, 214 to raise the rear of the cutting unit while the yoke arms the front of the cutting unit. The lifter support and pair of flexible linkages also may hold the cutting unit approximately level, and prevent swinging of the cutting unit. After the lifter support reaches a stop, the lift cylinder may retract further to pivot up lower lift arm 206 and upper lift arm 204 on lift axis 226 to raise the cutting unit to the transport position. Tension spring 216, connected between the upper lift arm and frame member 205, may assist the lift cylinder when raising the cutting unit to the transport position.

In one embodiment, triplex greensmower lift system 200 may hold the reel cutting unit approximately level and prevent swinging of the cutting unit while it is transported, and when it is lowered to the mowing position. To lower the reel cutting unit, lift cylinder 236 may be extended to pivot lower lift arm 206 and upper lift arm 204 downwardly together on lift axis 226. Lifter support 210 and flexible linkages 212, 214 may hold the cutting unit approximately level so that the rear of the cutting unit and rear roller 238 reach the turf along with the front of the cutting unit and front roller 240. Tension spring 216 may dampen or reduce the impact of the cutting unit on the turf. As the cutting unit reaches the turf, lift cylinder 236 may extend further to pivot lifter support 210 downwardly on lifter support axis 228, removing any tension in the pair of flexible linkages so the cutting unit can roll, yaw and pitch during mowing.

Figure 7:
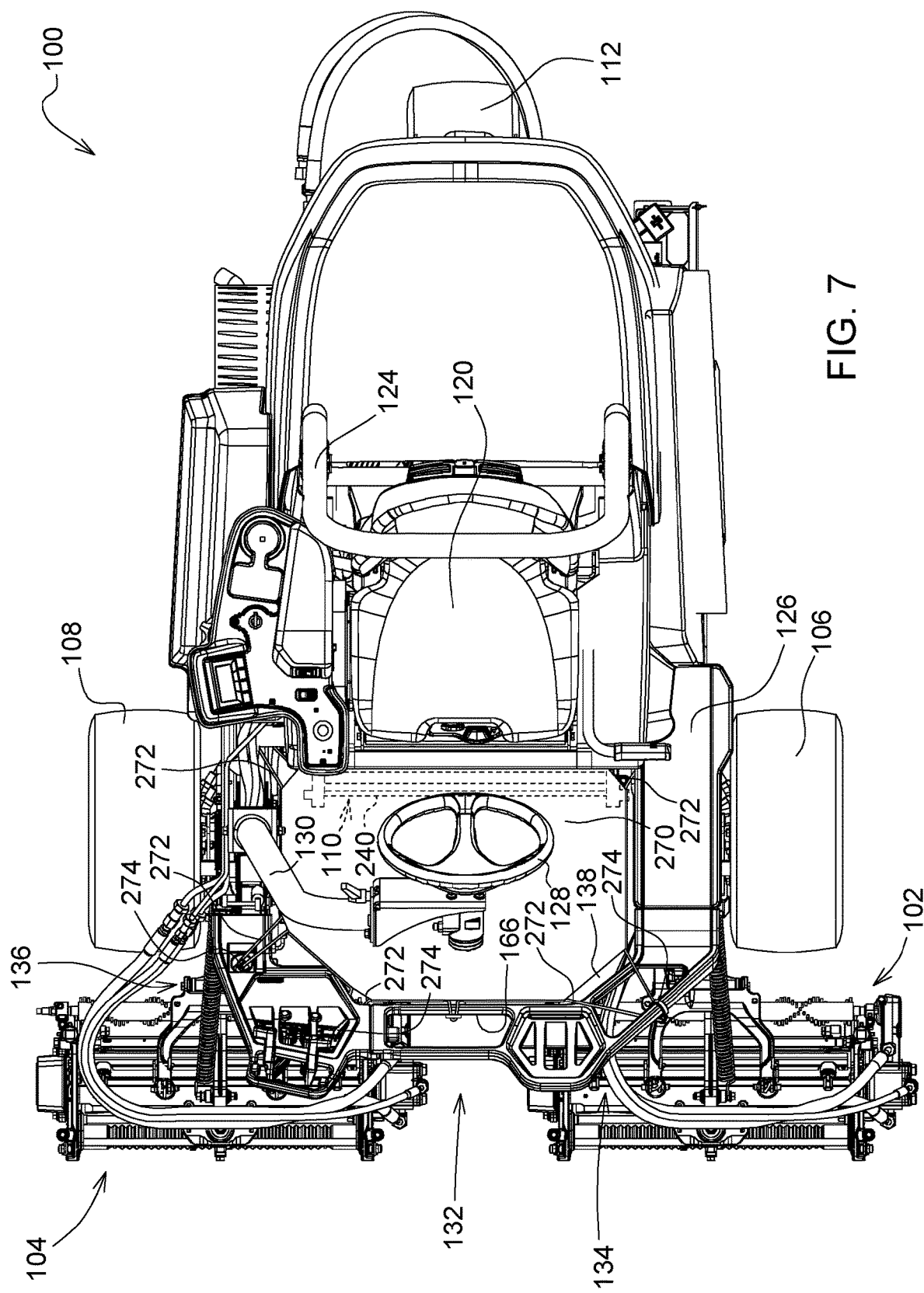
FIG. 7 is a perspective view of a triplex greensmower open foot platform cover according to one embodiment.
Figure 8:
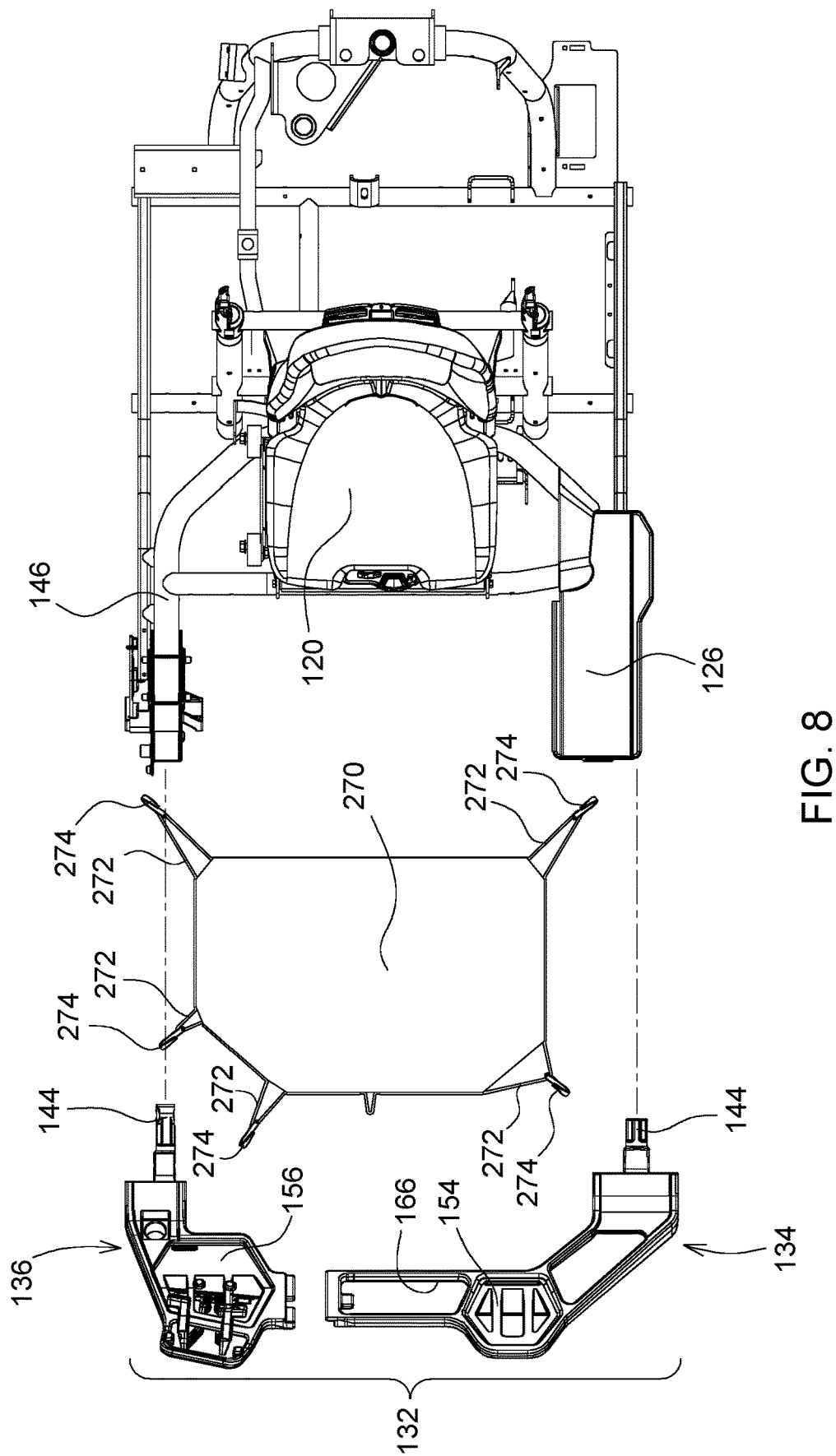
FIG. 8 is an exploded top view of a triplex greensmower open foot platform cover according to one embodiment.

FIGS. 7 and 8 show an embodiment of triplex greensmower 100 having open foot platform cover 270 removably attached to open foot platform 132. Open foot platform cover may substantially cover opening 138 in front of operator seat 120, including the forward portion of center or rear reel cutting unit 110. As shown in FIG. 7, the open foot platform cover may be positioned directly above at least the front roller 240 of center or rear reel cutting 110, and also over any other parts of the center or rear reel cutting unit that extend in front of operator seat 120. Open foot platform cover 270 may be a flexible semi-transparent fabric with a plurality of elastic bands or straps 272 at or adjacent its perimeter. The semi-transparent fabric should allow the center or rear reel cutting unit 110 to be visible to the operator while mowing. Hooks 274 may be attached to each of the elastic bands or straps for fastening the cover to open foot platform 132. For example, the hooks may engage left and right platform sections 134, 136, allowing easy removal of the cover from the open foot platform when servicing the center or rear reel cutting unit. The open foot platform cover may block grass and debris that is discharged from the front of the center or rear reel cutting unit while mowing without using a grass catcher. For example, the cover may block grass and debris from reaching the legs of an operator in the seated position.

Having described the preferred embodiment, it will become apparent that various modifications can be made without departing from the scope of the invention as defined in the accompanying claims.

We claim:

1. A triplex greensmower open foot platform, comprising:
   a left platform section and a right platform section, each section removably attached to a triplex greensmower with a coupling extending rearwardly from each section;
   the left platform section and the right platform section defining a perimeter of an opening in front of an operator seat on the triplex greensmower that has a larger length and width than a center reel cutting unit positioned rearwardly of a left reel cutting unit and a right reel cutting unit; and
   a semi-transparent fabric cover removably attached to the left platform section and the right platform section over the center reel cutting unit, the center reel cutting unit being visible through the cover from the operator seat while mowing.

2. The triplex greensmower open foot platform of claim 1 further comprising a latch between the left platform section and the right platform section.

3. The triplex greensmower open foot platform of claim 1 further comprising a locking member between one of the platform sections and the frame member.

4. The triplex greensmower open foot platform of claim 1 wherein the coupling includes a rectangular base and a post extending from the base.

5. A triplex greensmower open foot platform, comprising:
   a pair of removable platform sections engaging a frame member of a triplex greensmower; each of the sections including a foot rest;
   an opening between the pair of removable platform sections having larger dimensions than a rear reel cutting unit attached to a lift arm behind a pair of front reel cutting units; and
   a fabric cover extending over the opening and removably engaged to the pair of removable platform sections whereby mowing of the rear reel cutting unit is visible to an operator through the cover.

6. The triplex greensmower open foot platform of claim 5 further comprising a latch securing together the pair of removable platform sections.

7. The triplex greensmower open foot platform of claim 5 further comprising a neck portion extending between the foot rests on the pair of removable platform sections.

8. The triplex greensmower open foot platform of claim 5 wherein each removable platform section includes a coupling with a rectangular base that engages a rectangular channel.

9. A triplex greensmower open foot platform, comprising:
   an opening in front of an operator seat on a triplex greensmower providing visibility from the operator seat to a center reel cutting unit behind a left front reel cutting unit and a right front reel cutting unit and having sufficient dimensions for removal or installation of the center reel cutting unit or a grass catcher therethrough;
   a platform providing a perimeter at least partially around the opening, the platform including a footrest and a rearwardly extending coupling that is manually removable from the triplex greensmower; and
   a flexible cover removably attached to the platform and extending over the opening and at least a part of the center reel cutting unit whereby the flexible cover is sufficiently transparent to see the center reel cutting unit mowing from the operator seat.

10. The triplex greensmower open foot platform of claim 9 further comprising a latch between the pair of platform sections.

11. The triplex greensmower open foot platform of claim 9 further comprising an opening in at least one of the pair of platform sections for visibility from the operator seat to one of the front reel cutting units.

12. The triplex greensmower open foot platform of claim 9 further comprising a lock between at least one of the pair of platform sections and a frame member of the triplex greensmower.

* * * * *